US012444824B2

(12) United States Patent
Wang et al.

(10) Patent No.: US 12,444,824 B2
(45) Date of Patent: Oct. 14, 2025

(54) RESONATOR APPARATUS, FILTER APPARATUS AS WELL AS RADIO FREQUENCY AND MICROWAVE DEVICE

(71) Applicant: Telefonaktiebolaget LM Ericsson (publ), Stockholm (SE)

(72) Inventors: Honglan Wang, Beijing (CN); Weidong Wang, Beijing (CN); Jun Fu, Beijing (CN); Haitao Liu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 741 days.

(21) Appl. No.: 17/623,063

(22) PCT Filed: Apr. 17, 2020

(86) PCT No.: PCT/CN2020/085411
§ 371 (c)(1),
(2) Date: Dec. 27, 2021

(87) PCT Pub. No.: WO2020/259028
PCT Pub. Date: Dec. 30, 2020

(65) Prior Publication Data
US 2022/0271410 A1 Aug. 25, 2022

(30) Foreign Application Priority Data
Jun. 28, 2019 (CN) ......................... 201920995821.1

(51) Int. Cl.
*H01P 7/10* (2006.01)
*H01P 1/20* (2006.01)
*H04B 1/40* (2015.01)

(52) U.S. Cl.
CPC ................ *H01P 7/105* (2013.01); *H01P 1/20* (2013.01); *H04B 1/40* (2013.01)

(58) Field of Classification Search
CPC .......... H01P 7/082; H01P 7/00; H01P 1/2084; H01P 1/208; H01P 1/207; H01P 1/2086; H01P 7/08
See application file for complete search history.

(56) References Cited

U.S. PATENT DOCUMENTS 5,708,404 A 1/1998 Kurisu et al.
6,297,715 B1 * 10/2001 Fiedziuszko .......... H01P 1/2086 333/202
6,664,873 B2 * 12/2003 Tiihonen .................. H01P 7/10 333/197

FOREIGN PATENT DOCUMENTS

CN 105514551 A 4/2016
CN 106025474 A 10/2016
(Continued)

OTHER PUBLICATIONS

International Search Report and Written Opinion dated Jul. 15, 2020 in International Application No. PCT/CN2020/085411 (7 pages total).
(Continued)

*Primary Examiner* — Diana J. Cheng
(74) *Attorney, Agent, or Firm* — Rothwell, Figg, Ernst & Manbeck, P.C.

(57) ABSTRACT

A resonator apparatus, a filter apparatus as well as a radio frequency and microwave device are disclosed. According to an embodiment, the resonator apparatus comprises an electrically conductive case and a dual-mode dielectric resonator provided in the electrically conductive case. The dual-mode dielectric resonator comprises a first dielectric block having a shape of a columnar body whose cross section is a cruciform. A mode coupling structure for coupling two resonant modes of the dual-mode dielectric resonator is provided in the columnar body. A bottom face of the columnar body is supported by an inner face of the electri-
(Continued)

cally conductive case or by a supporting member provided on the inner face of the electrically conductive case. In at least one extending direction of a first extending direction and a second extending direction of the cruciform which are perpendicular to each other, lateral end faces of the columnar body are spaced apart from inner faces of the electrically conductive case.

16 Claims, 7 Drawing Sheets

(56) References Cited

FOREIGN PATENT DOCUMENTS

| | | | |
|---|---|---|---|
| CN | 106785263 | A | 5/2017 |
| CN | 107069154 | A | 8/2017 |
| CN | 209929461 | U | 1/2020 |
| EP | 1 091 441 | A2 | 4/2001 |
| EP | 1 098 385 | A2 | 5/2001 |
| EP | 3 217 469 | A1 | 9/2017 |
| JP | 3440513 | B2 | 8/2003 |
| WO | 02/05377 | A1 | 1/2002 |

OTHER PUBLICATIONS

Liang, X. et al., "Modeling of Cylindrical Dielectric Resonators in Rectangular Waveguides and Cavities", R-5, 1993 IEEE MTT-S Digest, pp. 597-600 (4 pages total).

Fiedziuszko, S. J. et al., "Dielectric Materials, Devices, and Circuits", IEEE Transactions on Microwave Theory and Techniques, vol. 50, No. 3, Mar. 2002, pp. 706-720 (15 pages total).

* cited by examiner

RESONATOR APPARATUS, FILTER APPARATUS AS WELL AS RADIO FREQUENCY AND MICROWAVE DEVICE

CROSS REFERENCE TO RELATED APPLICATIONS

This application is a 35 U.S.C. § 371 National Stage of International Patent Application No. PCT/CN2020/085411, filed Apr. 17, 2020, which claims priority to Chinese Patent Application No. 201920995821.1, filed Jun. 28, 2019. The above identified applications are incorporated by this reference.

TECHNICAL FIELD

Embodiments of the disclosure generally relate to radio frequency and microwave technology, and, more particularly, to a resonator apparatus, a filter apparatus as well as a radio frequency and microwave device.

BACKGROUND

This section introduces aspects that may facilitate better understanding of the present disclosure. Accordingly, the statements of this section are to be read in this light and are not to be understood as admissions about what is in the prior art or what is not in the prior art.

Band-pass filters are used in radio front-ends to let through only wanted frequencies. The band-pass filter in a base station radio front-end is generally made from cavity resonators that are coupled together. The transmitting filter of a macro base station requires high quality factor (e.g. high Q) resonators with large power handling ability, which leads to a large filter. With the continuous development of the 5th generation (5G) communication technology, the weight and volume of a filter are extremely limited. In order to reduce the size of a filter, dual-mode filters have been proposed. In a dual-mode filter, one dual-mode resonator can replace two single-mode resonators while keeping the filter's performance un-affected. In terms of size and weight, dual-mode resonators can save 50% cost compared with single-mode resonators.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved resonator apparatus. In particular, one of the problems to be solved by the disclosure is to release deformation stress.

According to a first aspect of the disclosure, there is provided a resonator apparatus. The resonator apparatus may comprise an electrically conductive case and a dual-mode dielectric resonator provided in the electrically conductive case. The dual-mode dielectric resonator may comprise a first dielectric block having a shape of a columnar body whose cross section is a cruciform. A mode coupling structure for coupling two resonant modes of the dual-mode dielectric resonator may be provided in the columnar body. A bottom face of the columnar body may be supported by an inner face of the electrically conductive case or by a supporting member provided on the inner face of the electrically conductive case. In at least one extending direction of a first extending direction and a second extending direction of the cruciform which are perpendicular to each other, lateral end faces of the columnar body may be spaced apart from inner faces of the electrically conductive case.

In this way, since the columnar body constituting the first dielectric block has at least two lateral end faces spaced apart from inner faces of the electrically conductive case, space is reserved for the first dielectric block to release deformation stress thereby enabling the resonator apparatus to have a larger power handling ability. In particular, with respect to the configuration in which four lateral end faces of the columnar body are spaced apart from 5 inner faces (where there are 6 inner faces in total) of the electrically conductive case, when a plurality of resonator apparatuses are cascaded with each other to obtain a filter apparatus, the electrically conductive case has four faces that can be used for mutual cascading of the resonator apparatuses, so that a greater degree of freedom can be obtained in the design of the filter apparatus.

In an embodiment of the disclosure, the dual-mode dielectric resonator may be a hybrid electric-field dual-mode dielectric resonator.

In an embodiment of the disclosure, the mode coupling structure may be a first cylindrical cavity extending from a top face of the columnar body towards the bottom face of the columnar body.

In an embodiment of the disclosure, the first cylindrical cavity may be disposed at a center of the cruciform.

In an embodiment of the disclosure, the first cylindrical cavity may have a cross section of a circle, an ellipse or a polygon.

In an embodiment of the disclosure, the first cylindrical cavity may have a cross section of an elongated ellipse or an elongated polygon, and an angle between the elongated ellipse or the elongated polygon and the first extending direction or the second extending direction may be 45 degrees.

In an embodiment of the disclosure, a mode mode tuning structure for moving a higher-order resonant mode of the dual-mode dielectric resonator away from a passing band of the dual-mode dielectric resonator may be provided in the columnar body.

In an embodiment of the disclosure, the mode tuning structure may be a second cylindrical cavity extending from the bottom face of the columnar body towards a top face of the columnar body.

In an embodiment of the disclosure, the second cylindrical cavity may be disposed at a center of the cruciform.

In an embodiment of the disclosure, the second cylindrical cavity may have a cross section of a circle, an ellipse or a polygon.

In an embodiment of the disclosure, at four protruding portions of the cruciform extending in the first extending direction and the second extending direction, four third cylindrical cavities may be provided to extend from the bottom face of the columnar body towards a top face of the columnar body. The resonator apparatus may further comprise tuning screws provided in the four third cylindrical cavities.

In an embodiment of the disclosure, the four third cylindrical cavities may be blind holes or through holes.

In an embodiment of the disclosure, the four third cylindrical cavities may have cross sections of circles, ellipses or polygons.

In an embodiment of the disclosure, at an intersection portion of the cruciform, the electrically conductive case may be provided with a through hole. The resonator apparatus may further comprise a tuning screw provided in the through hole.

In an embodiment of the disclosure, the through hole may correspond to a center of the cruciform.

In an embodiment of the disclosure, the supporting member may be made of a dielectric material or an electrically conductive material.

According to a second aspect of the disclosure, there is provided a filter apparatus. The filter apparatus may comprise one or multiple cascaded resonator apparatuses according to the above first aspect.

In an embodiment of the disclosure, the multiple cascaded resonator apparatuses may form a two-dimensional array.

According to a third aspect of the disclosure, there is provided a radio frequency and microwave device. The radio frequency and microwave device may comprise the filter apparatus according to the above second aspect.

In an embodiment of the disclosure, the radio frequency and microwave device may be a remote radio unit (RRU) or a base station.

BRIEF DESCRIPTION OF THE DRAWINGS

These and other objects, features and advantages of the disclosure will become apparent from the following detailed description of illustrative embodiments thereof, which are to be read in connection with the accompanying drawings. Apparently, the schematic structure diagrams in the following drawings are not necessarily drawn to scale, but exhibit various features in a simplified form. Furthermore, the drawings in the following description relate merely to some embodiments of the disclosure, but should not be construed as limiting the disclosure.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Currently, the basic designing concept of one typical dual-mode resonator is orthogonally intersecting two transverse magnetic-field (TM) single-mode resonators. This solution may meet the following issues. Firstly, when designing a filter, the TM-mode enabled dual-mode resonant cavity only supports linear topology thereby hugely limiting its application. This is because among the six surfaces of the dual-mode resonant cavity, four surfaces are occupied by the TM mode so that only two surfaces are left for cascading. Secondly, the structure of this solution is complicated and the fabrication cost thereof is high. Furthermore, because the multi-TM-mode coupling is very sensitive, it is very difficult to adjust and tune during mass production. Thirdly, the complicated intersecting structure causes unwanted parasitic resonance and unwanted higher-order mode. The parasitic pass band coexists with the wanted pass band. This results in that an additional band-stop section is required to suppress the un-wanted pass band. The additional band-stop section means additional size, weight and cost. Fourthly, the precise and tight mechanical structure leaves no space for the ceramic block which resides inside the metal cavity, to release deformation stress. This may shorten the life of the filter and reduce the power rating.

The present disclosure proposes an improved solution for resonator apparatus, filter apparatus as well as radio frequency and microwave device. Hereinafter, the solution will be described in detail with reference to FIGS. 1-9.

Figure 1:
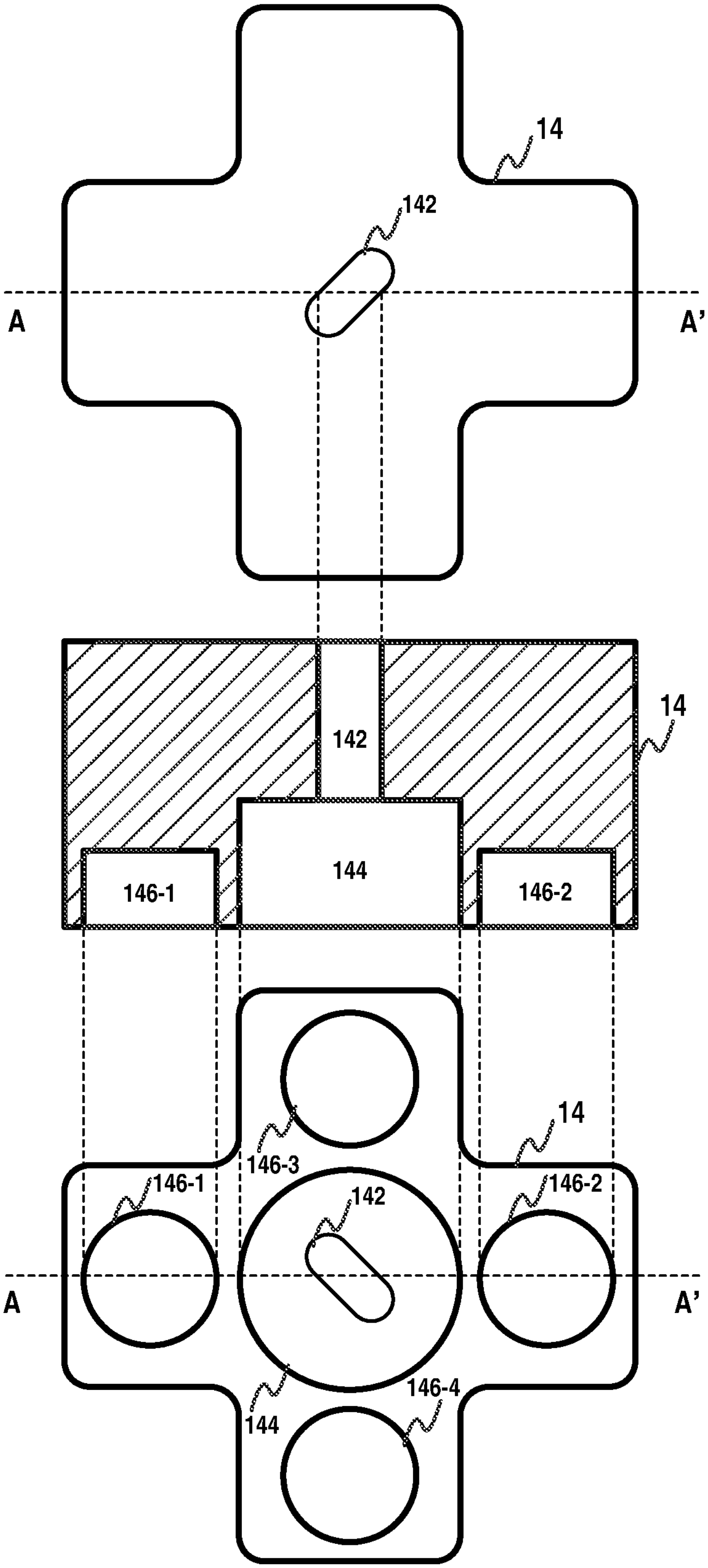
FIG. 1 is a structure diagram of the first dielectric block in a resonator apparatus according to an embodiment of the disclosure.

FIG. 1 is a structure diagram of the first dielectric block in a resonator apparatus according to an embodiment of the disclosure. The upper portion of FIG. 1 is a top view of the first dielectric block. The middle portion of FIG. 1 is a cross-sectional perspective view obtained by cutting the first dielectric block in a direction perpendicular to the paper surface along the line AA' shown in the top view. In the cross-sectional perspective view, the hatched portion is a cross section obtained by cutting the first dielectric block and the other lines are contour lines observed when observing towards the cross section. The lower portion of FIG. 1 is a bottom view of the first dielectric block. As shown in FIG. 1, the shape of the first dielectric block 14 is a columnar body whose cross section is a cruciform. As detailed later, the first dielectric block 14 can operate as a dual-mode dielectric resonator. For example, the first dielectric block 14 may be made of a ceramic material. A first cylindrical cavity 142, a second cylindrical cavity 144, and four third cylindrical cavities 146-1, 146-2, 146-3 and 146-4 are provided in the columnar body.

The first cylindrical cavity 142 extends from the top face of the columnar body towards the bottom face of the columnar body. In the example of FIG. 1, the first cylindrical cavity 142 is disposed at the center of the cruciform. The cross section of the first cylindrical cavity 142 is an elongated rectangle (the two short sides of the rectangle have certain curvature). The angle between the elongated rectangle and one of the first extending direction and the second extending direction of the cruciform which are perpendicular to each other is 45 degrees. With this configuration of 45 degrees, two resonant modes of the dual-mode dielectric resonator which the first dielectric block 14 functions as have the largest electric field values. The dimension of the first cylindrical cavity 142 (a cuboid in this example) may be set depending on the bandwidth of the filter. A very narrow band filter only requires a cuboid with a small size on the long side, while a wide bandwidth filter requires a cuboid with a large size on the long side. When the cuboid is rotated around an axis perpendicular to the paper surface, the strength of the coupling between the two resonant modes can be adjusted.

However, the present disclosure is not limited to the above example. As another example, the first cylindrical cavity 142 is not limited to being disposed at the center of the cruciform, but may be disposed at other suitable positions. As yet another example, the cross section of the first cylindrical cavity 142 may be an elongated ellipse or other elongated polygon, and the angle between the elongated ellipse or other polygon and the first extending direction or the second extending direction is 45 degrees. As yet another example, the angle between the elongated ellipse or polygon and the first extending direction or the second extending direction may be any other angle at the expense of a certain loss of performance. As yet another example, the cross section of the first cylindrical cavity 142 is not limited to an elongated ellipse or polygon, but may be any circle, ellipse or polygon. As yet another example, the first cylindrical cavity 142 may be replaced with any other suitable mode coupling structure as long as the structure can couple two resonant modes of the dual-mode dielectric resonator which the first dielectric block functions as.

The second cylindrical cavity 144 extends from the bottom face of the columnar body towards the top face of the columnar body. In the example of FIG. 1, the second cylindrical cavity 144 is disposed at the center of the cruciform, and the cross section of the second cylindrical cavity 144 is a circle. When designing the filter, the diameter and depth of the second cylindrical cavity 144 may be adjusted to shift the frequencies of higher-order resonant modes (e.g., the first harmonic spurious mode) to higher frequencies as much as possible.

However, the present disclosure is not limited to the above example. As another example, the second cylindrical cavity 144 is not limited to being disposed at the center of the cruciform, but may be disposed at other suitable positions. As yet another example, the cross section of the second cylindrical cavity 144 may be an ellipse or a polygon. As yet another example, the second cylindrical cavity 144 may be replaced with any other suitable mode tuning structure as long as the structure can move the higher-order resonant mode of the double-mode dielectric resonator (which the first dielectric block functions as) away from the passing band of the dual-mode dielectric resonator. As yet another example, it is also possible that the first dielectric block 14 does not have any mode tuning structure (e.g., the second cylindrical cavity 144). That is, the mode tuning structure may be an optional component of the first dielectric block 14.

Four third cylindrical cavities 146-1, 146-2, 146-3 and 146-4 are provided at four protruding portions of the cruciform extending in the first extending direction and the second extending direction. The four third cylindrical cavities extend from the bottom face of the columnar body towards the top face of the columnar body. The four third cylindrical cavities are used for mounting tuning screws therein. In the example of FIG. 1, each third cylindrical cavity is disposed at the center of a respective protruding portion, and each third cylindrical cavity has a cross section of a circle and is a blind hole. However, the present disclosure is not limited to this example. As another example, each third cylindrical cavity is not limited to being disposed at the center of the protruding portion, but may be disposed at other suitable positions. As yet another example, the cross section of each third cylindrical cavity may be an ellipse or a polygon. As yet another example, each third cylindrical cavity may be a through-hole. As yet another example, it is also possible that the first dielectric block 14 does not have the four third cylindrical cavities. That is, the four third cylindrical cavities may be optional components of the first dielectric block 14.

Figure 2:
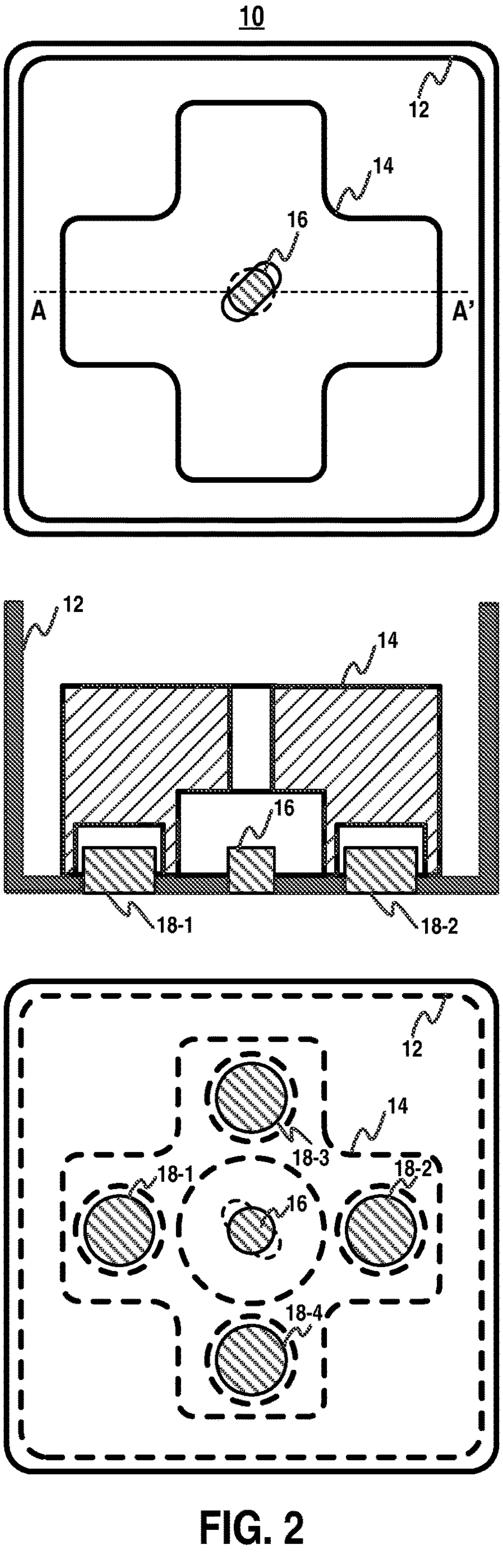
FIG. 2 is a structure diagram of a resonator apparatus according to an embodiment of the disclosure.

FIG. 2 is a structure diagram of a resonator apparatus according to an embodiment of the disclosure. For clarity, FIG. 2 shows the resonator apparatus in a state where the top face of the electrically conductive case 12 described later is removed. The upper portion of FIG. 2 is a top view of the resonator apparatus. In this top view, the circle representing the tuning screw 16 described later is partly shown as dashed lines. These portions shown as dashed lines indicate that these portions cannot be observed due to being occluded by the first dielectric block 14. The middle portion of FIG. 2 is a cross-sectional perspective view obtained by cutting the resonator apparatus in a direction perpendicular to the paper surface along the line AA' shown in the top view. In the cross-sectional perspective view, the hatched portion is a cross section obtained by cutting the resonator apparatus and the other lines are contour lines observed when observing towards the cross section. The lower portion of FIG. 2 is a bottom view of the resonator apparatus. The portions shown as dashed lines in the bottom view indicate that these portions cannot be observed due to being occluded by the bottom face of the electrically conductive case 12 described later.

As shown in FIG. 2, the resonator apparatus 10 comprises an electrically conductive case 12 and a first dielectric block 14 acting as a dual-mode dielectric resonator and provided in the electrically conductive case 12. For example, the electrically conductive case 12 may be made of metal. The bottom face of the columnar body constituting the first dielectric block 14 is supported by the inner face of the electrically conductive case 12. For example, the first dielectric block 14 may be fixed (e.g., welded or adhered) to the inner face of the electrically conductive case 12 in any suitable manner. In the first extending direction and the second extending direction of the cruciform which are perpendicular to each other, the lateral end faces of the columnar body are spaced apart from inner faces of the electrically conductive case.

However, the present disclosure is not limited to the above example. Firstly, the cross section of the electrically conductive case 12 is not limited to a square, but may be any other suitable polygon (e.g., a rectangle, an octagon, etc.). Secondly, the four lateral end faces of the columnar body are not necessarily all spaced apart from inner faces of the electrically conductive case, as long as the following condition is satisfied: in at least one extending direction of the first extending direction and the second extending direction of the cruciform which are perpendicular to each other, the lateral end faces of the columnar body are spaced apart from inner faces of the electrically conductive case. In this way, since the columnar body constituting the first dielectric block has at least two lateral end faces spaced apart from inner faces of the electrically conductive case, space is reserved for the first dielectric block to release deformation stress thereby enabling the resonator apparatus to have a larger power handing ability. In particular, with respect to the configuration in which four lateral end faces of the columnar body are spaced apart from 5 inner faces (where there are 6 inner faces in total) of the electrically conductive case, when a plurality of resonator apparatuses are cascaded with each other to obtain a filter apparatus, the electrically conductive case has four faces that can be used for mutual cascading of the resonator apparatuses, so that a greater degree of freedom can be obtained in the design of the filter apparatus.

In addition, as shown in FIG. 2, at the center of the cruciform, the electrically conductive case 12 is provided with a through hole. The resonator apparatus 10 further comprises a tuning screw 16 provided in the through hole. The tuning screw 16 may be used to tune the coupling between the two resonant modes of the dual-mode dielectric resonator. The tuning screw 16 may also be used to fine tune the frequency of each of the two resonant modes. For example, when the tuning screw 16 approaches the first dielectric block 14, the tuning screw 16 may shift the frequencies of the two resonant modes slightly.

However, the present disclosure is not limited to the above example. As another example, the position of the through-hole is not limited to the center of the cruciform, as long as it is provided at the intersection portion of the cruciform (i.e., the portion of the cruciform other than the four protruding portions extending in the first extending direction and the second extending direction). As yet another example, the resonator apparatus may not have the tuning screw 16 and corresponding through hole at the expense of a certain loss of performance. That is, the tuning screw 16 and the corresponding through hole may be optional components of the resonator apparatus.

In addition, as shown in FIG. 2, the electrically conductive case 12 is provided with four through holes at four protruding portions of the cruciform extending in the first extending direction and the second extending direction. The resonator apparatus 10 further comprises tuning screws 18-1, 18-2, 18-3 and 18-4 mounted in the four third cylindrical cavities 146-1, 146-2, 146-3 and 146-4 through the four through holes. Because the tuning screws are mounted, the mode frequencies can be conveniently tuned, which is suitable for mass production. The tuning screws 18-1 and 18-2 are used to adjust one resonant mode. The tuning screws 18-3 and 18-4 are used to adjust the other resonant mode. This allows independent tuning of the two resonant modes with good tuning range. However, the present disclosure is not limited to this example. As another example, the resonator apparatus may not have the four through holes and tuning screws 18-1, 18-2, 18-3 and 18-4 at the expense of a certain loss of performance. That is, the four through holes and tuning screws 18-1, 18-2, 18-3 and 18-4 may be optional components of the resonator apparatus.

Figure 3:
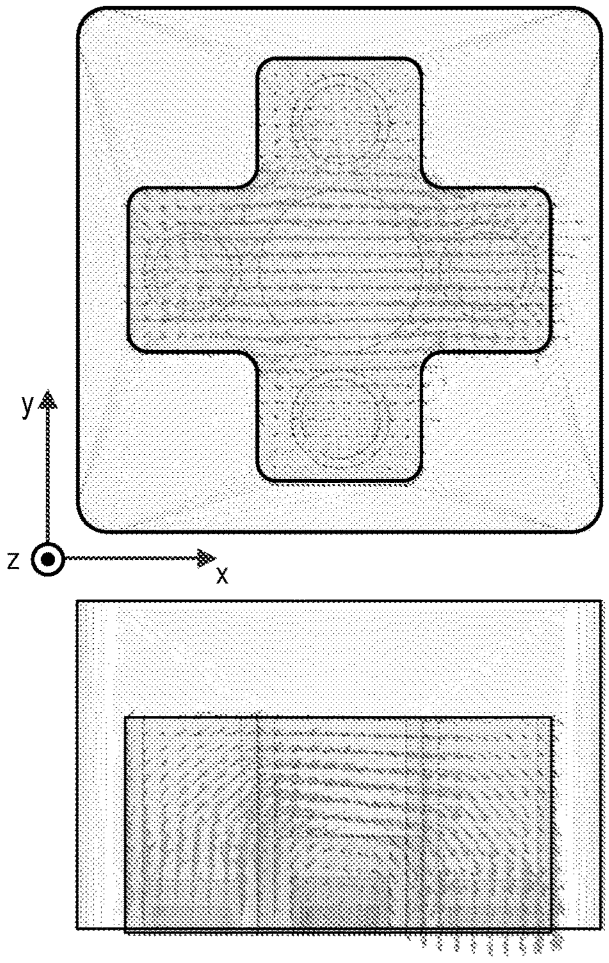
FIG. 3 is a diagram illustrating the electric field of a resonator apparatus according to an embodiment of the disclosure.

In contrast to the existing TM dual-mode resonator apparatus, the resonator apparatus according to an embodiment of the present disclosure utilizes two hybrid electric-field (HE) modes. It allows the two HE modes to resonate at different frequencies, covering the filter bandwidth. That is, the resonator apparatus according to an embodiment of the present disclosure is an HE dual-mode dielectric resonator. In one simulation example, the resonant frequency is about 2.1 GHz, and depending on the material and dimension of the first dielectric block (e.g., a ceramic block), a quality factor Q of about 4500-6000 can be achieved. According to this example, the two HE modes resonate at approximately the same frequency. FIG. 3 shows, in a top view at the upper portion, the electric field of the HE mode of the lower frequency (about 2140 MHz) in this example. The solid-line circles in the top view represent only the configuration of the first dielectric block. In this configuration, the first dielectric block is provided with a second cylindrical cavity, four third cylindrical cavities and their corresponding tuning screws, but is not provided with a first cylindrical cavity and its corresponding tuning screw. FIG. 3 shows, in a cross-sectional perspective view at the lower portion, the surface currents (in the ZX plane) of the lower frequency HE mode.

As shown in FIG. 3, the first dielectric block (e.g., a ceramic block having high permittivity) restrains the electric field of this HE mode to be within the space of the first dielectric block and closely surrounding the first dielectric block. The electric field of the HE mode at the higher frequency (approximately 2145 MHz) is orthogonal to the electric field of the HE mode at the lower frequency shown in FIG. 3. In this example, the two HE modes have the same width, length and height. Similar to the electric field of the lower frequency HE mode shown in FIG. 3, the electric field of the higher frequency HE mode is also restrained within the space of the first dielectric block and closely surrounds the first dielectric block. When the first dielectric block is provided with the first cylindrical cavity, the electric fields of the two HE modes are coupled. At this time, the coupled electric fields are still restrained within the space of the first dielectric block and closely surround the first dielectric block. For simplicity, the electric field of the higher frequency HE mode and the electric field in the case where coupling between the two HE modes occurs are not shown in FIG. 3. It should be noted that the present disclosure is not limited to the above simulation example. The dimension and dielectric constant of the first dielectric block may be adjusted according to different practical requirements to achieve other frequency bands and Q values.

In this way, since the coupled two electric fields are restrained in the center of the cavity of the electrically conductive case and closely surround the first dielectric block, more inner faces of the cavity of the electrically conductive case of the resonator apparatus according to an embodiment of the present disclosure can be freed for cascading between resonator apparatuses, compared to the dual-mode dielectric resonator using TM modes, for the configuration in which four lateral end faces of the columnar body are spaced apart from 5 inner faces (where there are 6 inner faces in total) of the electrically conductive case. This enables the cascading topology of resonator apparatuses to be expanded from one dimension to two dimensions, thereby enabling the designer to have more freedom when designing a multi-cavity filter apparatus.

In addition, for the configuration in which the columnar body has at least two lateral end faces spaced apart from inner faces of the electrically conductive case, the higher harmonics of the HE dual-mode are far from the pass band as compared with the existing TM two-mode resonator apparatus, and therefore, there is no unwanted parasitic pass band, and no additional band-rejection filter is required for suppressing the unwanted parasitic pass band. Thus, the resonator apparatus according to the embodiment can be made more compact and with a lower cost. In addition, since the first dielectric block for generating the HE dual-mode has only three faces at most in contact with the electrically conductive case, a sufficient space is reserved for the first dielectric block to release deformation stress. This enables the resonator apparatus of the embodiment to have a larger power handling ability.

Figure 4:
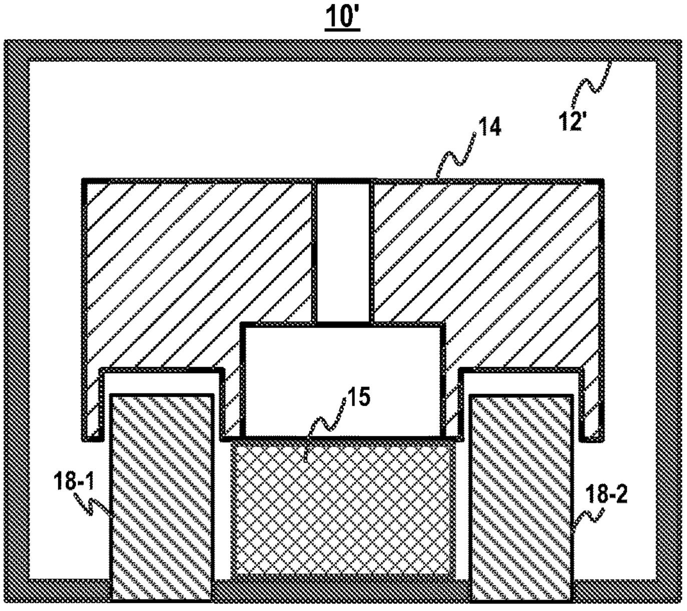
FIG. 4 is cross-sectional perspective view of a resonator apparatus according to an alternative embodiment of the disclosure.

FIG. 4 is cross-sectional perspective view of a resonator apparatus according to an alternative embodiment of the disclosure. As can be seen by comparison with the cross-sectional perspective view in FIG. 2, the main difference between the resonator apparatus 10' of the alternative embodiment and the embodiment of FIG. 2 lies in that the bottom face of the columnar body constituting the first dielectric block 14 in the alternative embodiment is supported by a second dielectric block 15 provided on the inner face of the electrically conductive case 12'. Because the second dielectric block 15 is provided, this alternative embodiment does not have the tuning screw 16 and the corresponding through hole disposed in the electrically conductive case, compared to the embodiment of FIG. 2. Alternatively, the second dielectric block 15 may be replaced with an electrically conductive material block (e.g., a metal block). That is, the bottom face of the columnar body may be supported by a support member provided on the inner face of the electrically conductive case. In the case where the electrically conductive material block is employed, the resonator apparatus has a through hole disposed in the electrically conductive case and a tuning screw extending through the through hole and the electrically conductive material block into the second cylindrical cavity. Although the above alternative embodiments require a larger cavity than the embodiment of FIG. 2 for the same resonant frequency, the resonator apparatuses of these alternative embodiments can produce similar technical effects.

Based on the above description, at least one embodiment of the present disclosure provides a resonator apparatus. The resonator apparatus comprises an electrically conductive case and a dual-mode dielectric resonator provided in the electrically conductive case. The dual-mode dielectric resonator comprises a first dielectric block having a shape of a columnar body whose cross section is a cruciform. A mode coupling structure for coupling two resonant modes of the dual-mode dielectric resonator is provided in the columnar body. A bottom face of the columnar body is supported by an inner face of the electrically conductive case or by a supporting member provided on the inner face of the electrically conductive case. In at least one extending direction of a first extending direction and a second extending direction of the cruciform which are perpendicular to each other, lateral end faces of the columnar body are spaced apart from inner faces of the electrically conductive case.

Figure 5A:
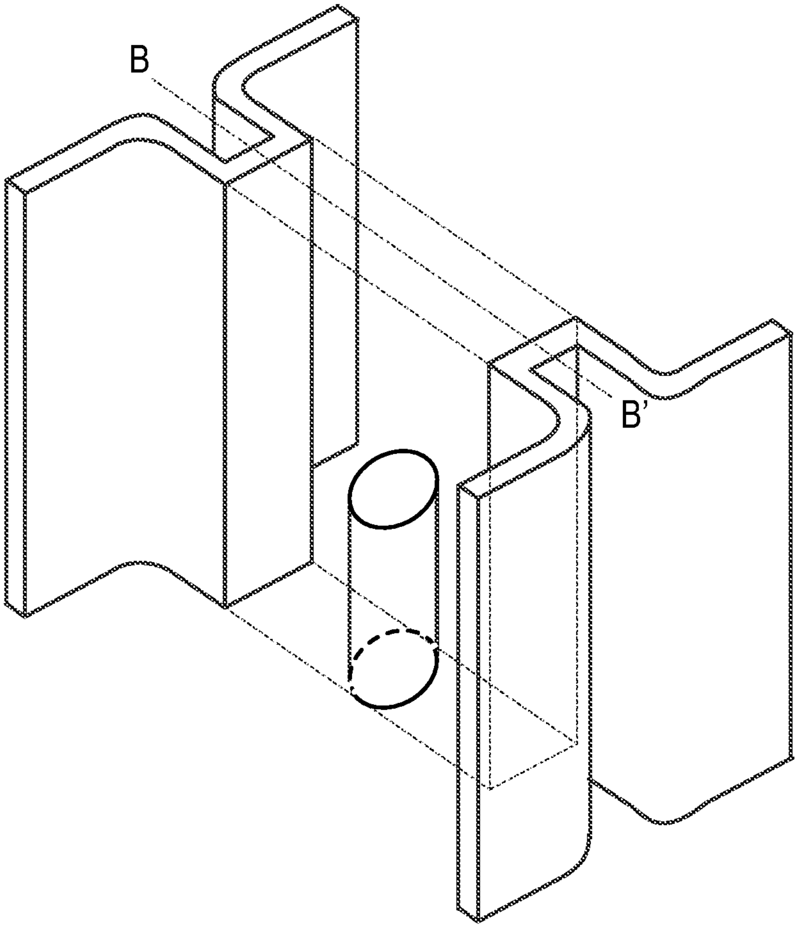
FIGS. 5A-5B illustrate an example of a cascading portion usable for cascading two resonator apparatuses.
Figure 5B:
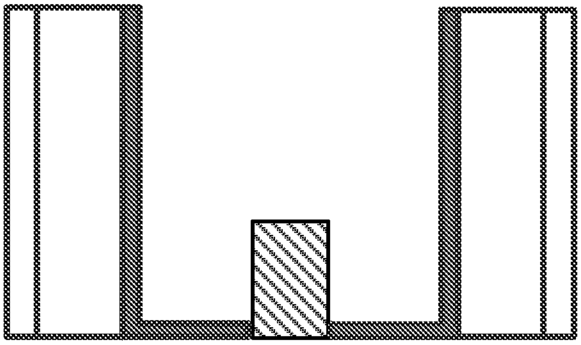

FIGS. 5A-5B illustrate an example of a cascading portion usable for cascading two resonator apparatuses. For clarity, FIGS. 5A and 5B show the cascaded resonator apparatuses in a state where the top faces of the electrically conductive cases are removed. FIG. 5A is a perspective view. FIG. 5B is a cross-sectional perspective view obtained by cutting the cascading portion in the up-down direction along the line BB' shown in the perspective view. In the cross-sectional perspective view, the hatched portion is a cross section obtained by cutting the cascading portion and the other lines are contour lines observed when observing towards the cross section. As shown, at the center of the cascading portion, a tuning screw is mounted from a mounting face (a bottom face in this example) of the electrically conductive case.

Figure 6A:
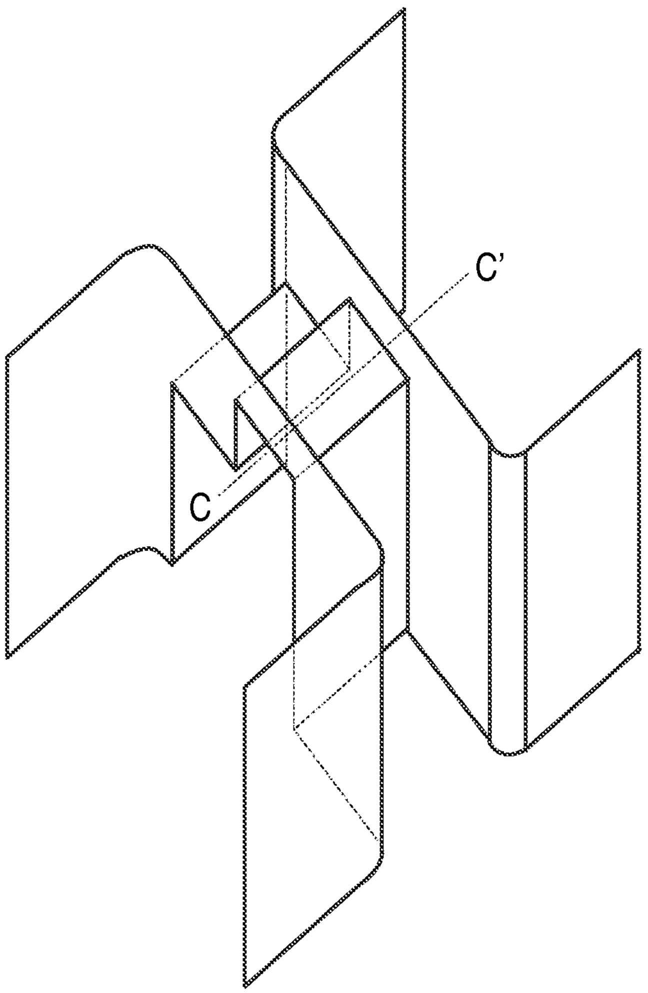
FIGS. 6A-6B illustrate another example of a cascading portion usable for cascading two resonator apparatuses.
Figure 6B:
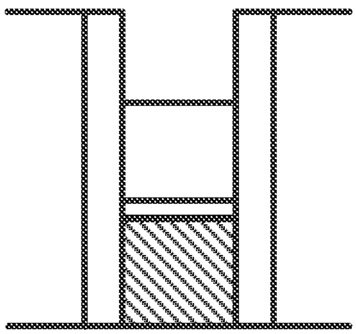

FIGS. 6A-6B illustrate another example of a cascading portion usable for cascading two resonator apparatuses. FIG. 6A is a perspective view. For clarity, a tuning screw similar to that of FIG. 5A mounted through a mounting face (in this example, a bottom face, i.e., a rectangular bottom face corresponding to the rectangular top face through which the line CC' passes) of the electrically conductive case in the cascading portion is not shown in FIG. 6A. FIG. 6B is a cross-sectional perspective view obtained by cutting the cascading portion in the up-down direction along the line CC' shown in the perspective view. In the cross-sectional perspective view, the hatched portion is a cross section obtained by cutting the cascading portion (i.e., a cross section by cutting the tuning screw) and the other lines are contour lines observed when observing towards the cross section. It should be noted that the present disclosure is not limited to the examples shown in FIGS. 5A-5B and FIGS. 6A-6B. Any other suitable cascading portion for cascading two resonator apparatuses may be used in the present disclosure.

Figure 7A:
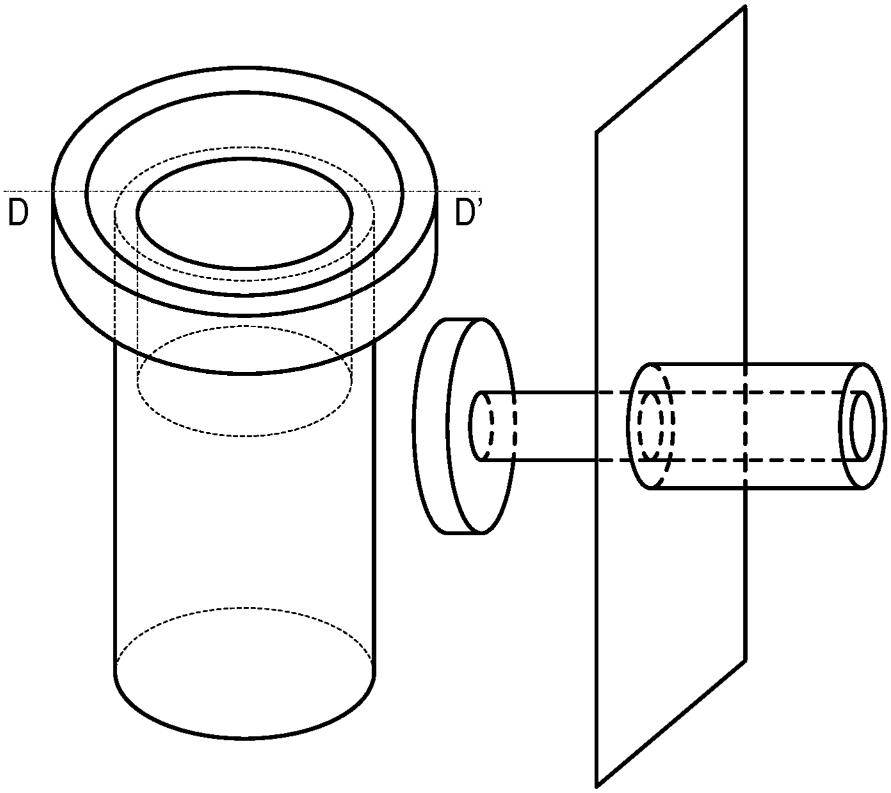
FIGS. 7A-7B illustrate the structure of an input/output apparatus usable along with a filter apparatus according to an embodiment of the disclosure.
Figure 7B:
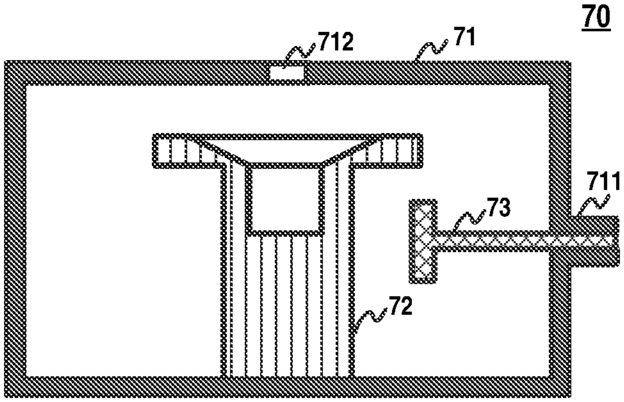

FIGS. 7A-7B illustrate the structure of an input/output apparatus usable along with a filter apparatus according to an embodiment of the disclosure. The input/output apparatus may be used for coupling radio frequency and microwave signal into the filter apparatus or for coupling the signal from the filter apparatus to the outside. The single-mode air coaxial resonator contained in the input/output apparatus may also act as an intermediate resonator between two dual-mode resonator apparatuses. FIG. 7A is a perspective view. For clarity, only one side face of the electrically conductive case of the input/output apparatus is shown in FIG. 7A, and the other faces of the electrically conductive case are not shown. FIG. 7B is a cross-sectional perspective view obtained by cutting the input/output apparatus in the up-down direction along the line DD' shown in the perspective view. In the cross-sectional perspective view, the hatched portion is a cross section obtained by cutting the input/output apparatus and the other lines are contour lines observed when observing towards the cross section.

As shown, the input/output apparatus 70 comprises an electrically conductive case 71, and a metal pipe 72 and a transmission line 73 provided in the electrically conductive case 71. The top portion of the metal tube 72 is hollow and is formed with a flange. A connector 711, which constitutes an input/output coaxial port with the transmission line 73, is provided on the electrically conductive case 71. The coaxial port is coupled by its transmission line 73 to the metal tube 72 constituting the coaxial resonator. At the position corresponding to the center of the metal pipe 72, a through hole 712 is formed in the top face of the electrically conductive case 71. In this example, the coupling mode between the coaxial port and the coaxial resonator employs electrical coupling. As another example, magnetic coupling or electromagnetic coupling may also be employed. It should be noted that the present disclosure is not limited to the example shown in FIGS. 7A-7B. Any other suitable input/output apparatus for a filter apparatus may be used in the present disclosure. It should also be noted that the input/output apparatus may be an optional component of a filter apparatus according to an embodiment of the disclosure.

Figure 8:
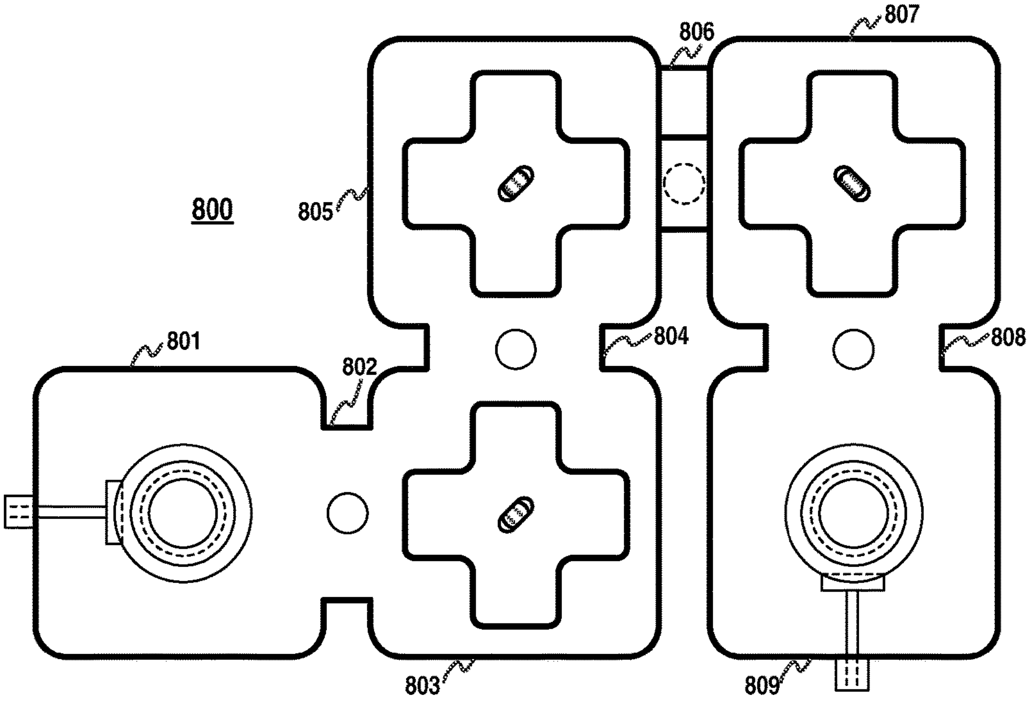
FIG. 8 is a diagram illustrating an exemplary example of a filter apparatus according to an embodiment of the disclosure.

FIG. 8 is a diagram illustrating an exemplary example of a filter apparatus according to an embodiment of the disclosure. For clarity, FIG. 8 shows the filter apparatus in a state where the top faces of the electrically conductive cases are removed. The portions shown as dashed lines in this figure indicate that these portions cannot be observed when looking down the filter apparatus due to being occluded by other portions. As shown, the filter apparatus 800 comprises an input apparatus 801 (as shown in FIGS. 7A-7B), three resonator apparatuses 803, 805 and 807 (as shown in FIG. 2 or FIG. 4), and an output apparatus 809 (as shown in FIGS. 7A-7B). The input apparatus 801 is connected with the resonator apparatus 803 via a cascading portion 802. The resonator apparatus 803 is connected with the resonator apparatus 805 via a cascading portion 804. The resonator apparatus 805 is connected with the resonator apparatus 807 via a cascading portion 806. The resonator apparatus 807 is connected with the output apparatus 809 via a cascading portion 808. The structure of the cascading portions 802 and 804 is shown in FIGS. 5A-5B. The structure of the cascading portion 806 is shown in FIGS. 6A-6B. In this example, three resonator apparatuses 803, 805 and 807 cascaded together can form a two-dimensional array, because four side faces of the dual-mode resonating cavity can all be used for cascading. This enables the designer to have more freedom when designing a multi-cavity filter apparatus. The degree of selectivity of the filter apparatus can be controlled by changing the aspect ratio of the two-mode resonating cavities.

However, the present disclosure is not limited to the above example. Firstly, the number of resonator apparatuses contained in the filter apparatus may be one. Secondly, no matter the cascading between a plurality of dual-mode resonating cavities or the cascading between dual-mode resonating cavities and the coaxial resonators, the number of the cascaded components may be be two or more. As an example, one or more coaxial resonators may be cascaded at either end of a dual-mode resonating cavity. As another example, at one end of a dual-mode resonating cavity, there may be one (and possibly only one) coaxial resonator which feeds the input to the dual-mode resonating cavity.

Based on the above description, at least one embodiment of the present disclosure provides a filter apparatus. The filter apparatus comprises one or multiple cascaded resonator apparatuses. The resonator apparatus comprises an electrically conductive case and a dual-mode dielectric resonator provided in the electrically conductive case. The dual-mode dielectric resonator comprises a first dielectric block having a shape of a columnar body whose cross section is a cruciform. A mode coupling structure for coupling two resonant modes of the dual-mode dielectric resonator is provided in the columnar body. A bottom face of the columnar body is supported by an inner face of the electrically conductive case or by a supporting member provided on the inner face of the electrically conductive case. In at least one extending direction of a first extending direction and a second extending direction of the cruciform which are perpendicular to each other, lateral end faces of the columnar body are spaced apart from inner faces of the electrically conductive case.

In at least one aspect, the present disclosure also provides a radio frequency and microwave device comprising the filter apparatus described above. Examples of the radio frequency and microwave device include, but not limited to, a remote radio unit (RRU), a base station, etc. The other configurations of the radio frequency and microwave device may be well known to those skilled in the art and thus their details are omitted here.

Figure 9:
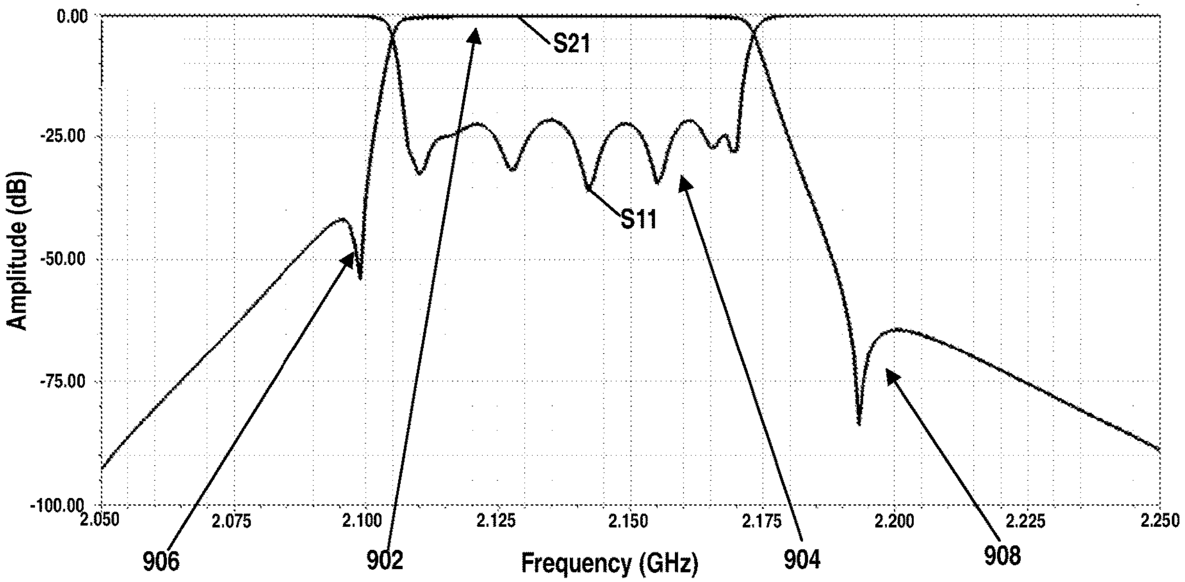
FIG. 9 is a simulated response curve of a filter apparatus according to an embodiment of the disclosure.

FIG. 9 is a simulated response curve of a filter apparatus according to an embodiment of the disclosure. The parameter S11 reflects the return loss of the filter apparatus and the parameter S21 reflects the pass band of the filter apparatus. As can be seen from the portion 902 of S21 and the portion 904 of S11, the filter apparatus achieves low loss in the range of the pass band and there is a good matching achieved between the pass band and the return loss. As can be seen from the portions 906 and 908 of S21, the filter apparatus achieves high out-of-band suppression.

Unless otherwise defined, all terms used herein (including technical and scientific terms) have the same meaning as commonly understood by those skilled in the art. It should be further understood that terms, such as those defined in commonly used dictionaries, should be interpreted as having a meaning that is consistent with their meaning in the context of the specification and the relevant art and should not be interpreted in an ideal or excessively formal sense unless clearly defined in the present disclosure.

The terminology used herein is for the purpose of describing particular embodiments only and is not intended to limit the present disclosure. As used herein, the singular forms “a”, “an” and “the” are intended to include the plural forms as well, unless the context clearly indicates otherwise. It will be further understood that the terms “comprises”, “comprising”, “has”, “having”, “includes” and/or “including”, when used herein, specify the presence of stated features, elements, and/or components, but do not preclude the presence or addition of one or more other features, elements, components and/or combinations thereof. As used herein, the statement that two or more parts are “coupled”, “connected” or “cascaded” together shall mean that the parts are joined together either directly or joined through one or more intermediate parts.

It should be understood that, although the terms “first”, “second” and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term “and/or” includes any and all combinations of one or more of the associated listed terms.

References in the present disclosure to “one embodiment”, “an embodiment” and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Hereinbefore, the description has been made in a state where the bottom face of the first dielectric block is mounted on the bottom face of the electrically conductive case. However, the first dielectric block may be mounted on the top face of the electrically conductive case, and the positions of the through holes and corresponding tuning screws on the electrically conductive case depend on the mounting face of the first dielectric block. This may correspond, for example, to the state where the cross-sectional perspective view at the middle portion of FIG. 2 has been rotated 180 degrees within the paper surface. That is, the “bottom face of the columnar body” may be replaced with “a first face of the columnar body having a shape of a cruciform”, and the “top face of the columnar body” may be replaced with “an opposite second face of the columnar body having a shape of a cruciform”. Accordingly, the “bottom face of the electrically conductive case” may be replaced with “a first face of the electrically conductive case on which the first dielectric block is mounted”, and the “top face of the electrically conductive case” may be replaced with “a second face of the electrically conductive case, which is opposite to the first face of the electrically conductive case”. Accordingly, it is to be understood that the orientation or position relationships indicated by the terms such as “top”, “bottom”, “inner”, “outer”, etc. are the orientation or position relationships based on the drawings, which are only used to facilitate the description of the present disclosure or simplify the description, and are not intended to indicate or suggest that the members, components or apparatuses should have the specific orientations, or should be manufactured and operated in the specific orientations. Therefore, the terms should not be construed as limiting the present disclosure.

As used herein, the term “examples” particularly when followed by a listing of terms is merely exemplary and illustrative, and should not be deemed to be exclusive. It should be noted that various aspects of the present disclosure may be implemented individually or in combination with one or more other aspects. Furthermore, the detailed description and specific embodiments are intended for purposes of illustration only and are not intended to limit the scope of the disclosure.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A resonator apparatus comprising:

an electrically conductive case and a dual-mode dielectric resonator provided in the electrically conductive case;

wherein the dual-mode dielectric resonator comprises a first dielectric block having a shape of a columnar body whose cross section is a cruciform;

wherein a mode coupling structure for coupling two resonant modes of the dual-mode dielectric resonator is provided in the columnar body;

wherein a bottom face of the columnar body is supported by an inner face of the electrically conductive case or by a supporting member provided on the inner face of the electrically conductive case;

wherein in at least one extending direction of a first extending direction and a second extending direction of the cruciform which are perpendicular to each other, lateral end faces of the columnar body are spaced apart from inner faces of the electrically conductive case, wherein the mode coupling structure is a first cylindrical cavity extending from a top face of the columnar body towards the bottom face of the columnar body, and further wherein the first cylindrical cavity is disposed at a center of the cruciform, the first cylindrical cavity has a cross section of a circle, an ellipse, or a polygon, and/or the first cylindrical cavity has a cross section of an elongated ellipse or an elongated polygon, and an angle between the elongated ellipse or the elongated polygon and the first extending direction or the second extending direction is 45 degrees.

2. The resonator apparatus of claim 1, wherein the dual-mode dielectric resonator is a hybrid electric-field dual-mode dielectric resonator.

3. The resonator apparatus of claim 1, wherein a mode tuning structure for moving a higher-order resonant mode of the dual-mode dielectric resonator away from a passing band of the dual-mode dielectric resonator is provided in the columnar body.

4. The resonator apparatus of claim 3, wherein the mode tuning structure is a second cylindrical cavity extending from the bottom face of the columnar body towards a top face of the columnar body, and further wherein the second cylindrical cavity is disposed at a center of the cruciform, and/or the second cylindrical cavity has a cross section of a circle, an ellipse or a polygon.

5. The resonator apparatus of claim 1, wherein at four protruding portions of the cruciform extending in the first extending direction and the second extending direction, four third cylindrical cavities are provided to extend from the bottom face of the columnar body towards a top face of the columnar body; and wherein the resonator apparatus further comprises tuning screws provided in the four third cylindrical cavities.

6. The resonator apparatus of claim 5, wherein the four third cylindrical cavities are blind holes or through holes.

7. The resonator apparatus of claim 5, wherein the four third cylindrical cavities have cross sections of circles, ellipses or polygons.

8. The resonator apparatus of claim 1, wherein at an intersection portion of the cruciform, the electrically conductive case is provided with a through hole; and wherein the resonator apparatus further comprises a tuning screw provided in the through hole.

9. The resonator apparatus of claim 8, wherein the through hole corresponds to a center of the cruciform.

10. The resonator apparatus of claim 1, wherein the supporting member is made of a dielectric material or an electrically conductive material.

11. A filter apparatus comprising a cascaded resonator apparatus comprising the resonator apparatus of claim 1 and a second resonator apparatus.

12. The filter apparatus of claim 11, wherein the cascaded resonator apparatuses form a two-dimensional array.

13. A radio frequency and microwave device comprising the filter apparatus of claim 11.

14. The radio frequency and microwave device according to claim 13, wherein the radio frequency and microwave device is a remote radio unit or a base station.

15. The resonator apparatus of claim 1, wherein the dual-mode dielectric resonator comprises four third cylindrical cavities.

16. The resonator apparatus of claim 1, wherein the resonator apparatus further comprises a plurality of tuning screws.

* * * * *